Patented Nov. 6, 1928.

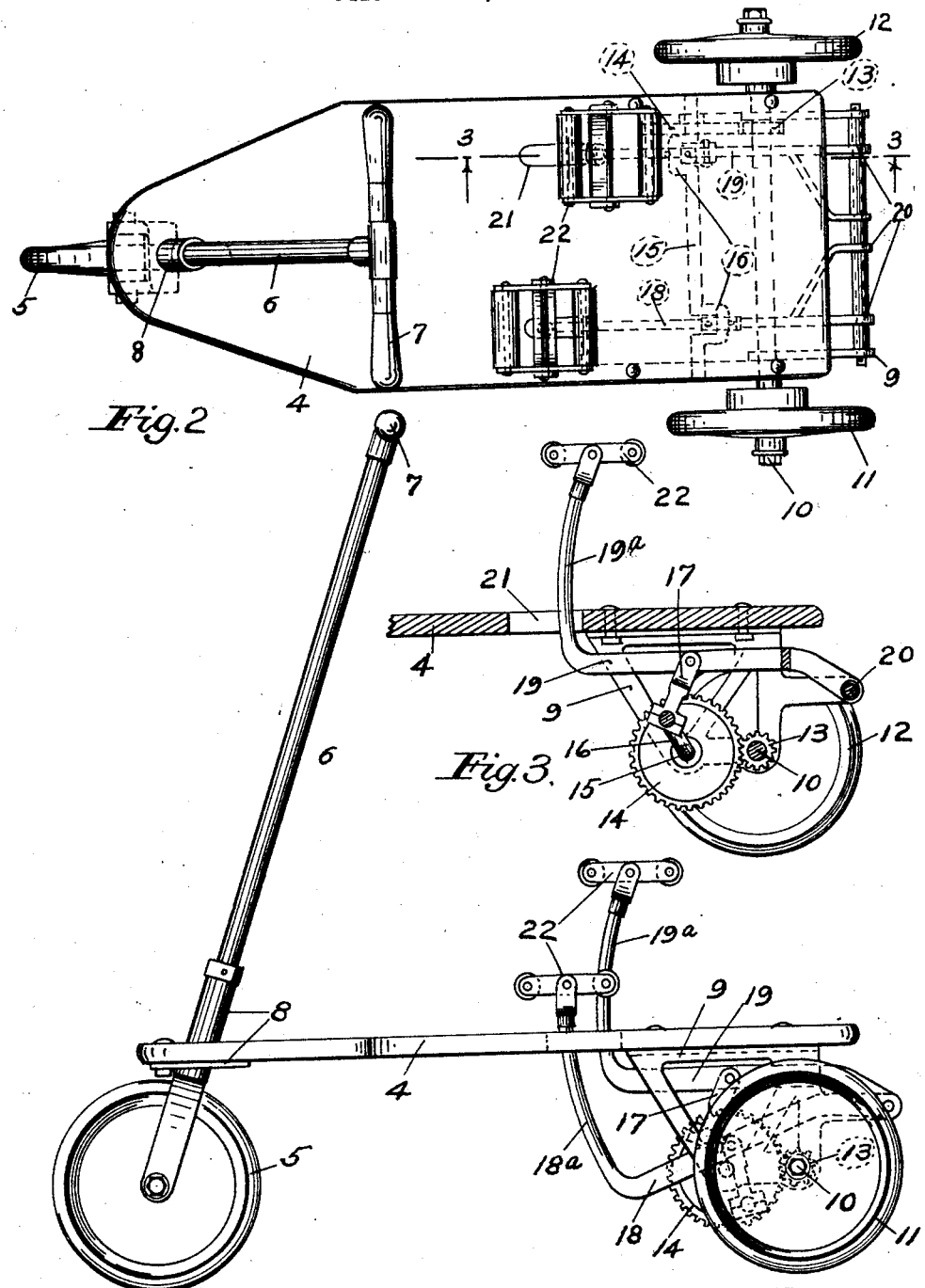

1,690,342

UNITED STATES PATENT OFFICE.

GUSTAV N. MADSEN, OF MINNEAPOLIS, MINNESOTA.

VELOCIPEDE.

Application filed December 12, 1927. Serial No. 239,562.

This invention relates to velocipedes, for children, and the primary object is to provide an efficient, practical and novel device of that class, which is hand steered and foot propelled, and in which the child, or other operator, stands on the propelling devices so that they may be actuated by a kicking or running action of the operator, who in turn supports himself in an upright position by grasping the handle or cross bar of the steering mechanism. Further and more specific objects will be disclosed in the course of the following specification, reference being had to the accompanying drawing, in which:

Fig. 1 is a side elevation of my improved velocipede, as seen from the left.

Fig. 2 is a plan view of the device as shown in Fig. 1.

Fig. 3 is a detail sectional elevation, as on the line 3—3 in Fig. 2

Referring to the drawing more particularly and by reference characters, 4 designates a platform, supported at its front end by a steering wheel 5, carried in the lower, forked end of a shaft 6 having a cross bar 7, at its upper end, and which is journaled to rotate in a bearing casting 8, at the front end of the platform. The shaft 6 is preferably inclined rearwardly so that the handle 7 will be in a more convenient position for the operator.

At its rear end the platform 4 is supported on a frame 9 in which is journaled the axle 10 of a pair of laterally spaced, rear wheels 11 and 12. One of these wheels rotates on the axle 10 and the other is secured to it so that it will rotate therewith. The axle shaft 10 has a pinion 13 that meshes with and is driven by a spur gear 14, on a shaft 15. The shaft 15 is also journaled in the frame 9, and is provided with a pair of oppositely disposed cranks 16, that are connected by link rods 17 to levers 18 and 19. The levers 18, 19 are pivoted, at their rear ends, to the frame 9, as at 20, while their forward ends terminate in a pair of arc-shaped, upright sections 18ª, 19ª, that operated through slots or holes 21 in the platform 4. At their upper ends the members 18ª, 19ª are provided with pedals or treadles 22.

When traveling on the device, the operator may stand with one foot on the platform and operate one of the pedals with the other foot. To gain greater speed and more power, however, he stands on the two treadles so that he can alternately actuate them with the full weight of the body.

It is understood that suitable modifications may be made in the general design and structural details of the invention as herein shown, provided, however, that said modifications come within the spirit and scope of the appended claims.

Having now therefore fully shown and described my invention, what I claim to be new and desire to protect by Letters Patent is:

1. A velocipede comprising a frame having a platform, a steering unit at the front of the frame, an axle journaled in the rear of the frame and having ground wheels at its ends, a crank shaft journaled in the frame parallel with the axle and having drive connection therewith, substantially L-shaped treadle levers fulcrumed in the frame rearwardly of the axle and having link connections with the crank shaft, said treadle levers having horizontal portions disposed below the platform and upright portions operating through apertures in the platform.

2. A velocipede comprising a frame, a platform on the frame, a steering unit at the front of the frame, an axle journaled in the rear of the frame and having ground wheels at its ends, a crank shaft journaled in the frame parallel with the axle and having drive connection therewith, treadle levers fulcrumed in the frame rearwardly of the axle and having link connections with the crank shaft, said levers having upright pedal supporting arms at their forward ends operating through the platform.

In testimony whereof I affix my signature.

GUSTAV N. MADSEN.